Patented June 26, 1945

2,379,218

UNITED STATES PATENT OFFICE 2,379,218

METHOD OF CASTING RESINS

William R. Dial and Charles Gould, Akron, Ohio, assignors to Pittsburgh Plate Glass Company, Pittsburgh, Pa., a corporation of Pennsylvania No Drawing. Application June 4, 1942, Serial No. 445,806

6 Claims. (Cl. 18—58)

This invention relates to the cast polymerization of unsaturated alcohol polyesters of polyacids or polybasic acids. The cast polymerization of such materials is often exceedingly difficult since fracturing of the polymer often occurs during the process and consequently, a finally polymerized product having little or no utility often is obtained.

In accordance with the present invention, it has been found that this difficulty may be avoided, and cast polymerized sheets of large surface area compared to the thickness thereof may be prepared, by applying a pressure to the polymerizing composition sufficient to force the preponderant amount of shrinkage occurring during polymerizing to take place in a single dimension. Often the shrinkage may occur substantially wholly in one dimension until the polymer is released or removed from the mold in which it is cast. After polymerization has progressed to a point such that the polymer possesses sufficient strength, for example, after the polymer has been polymerized until it is about 85 to 90 percent completely polymerized as determined by the density, percentage of insolubility, refractive index, degree of unsaturation, or other convenient method of ascertaining degree of polymerization, the pressure may be released and the polymers removed from the mold. Upon such removal shrinkage of the polymer in the other dimensions may and often does occur to some extent.

The polymerization is generally conducted in a mold provided with a pair of side walls generally having substantial rigidity and smoothness, such as polished metal, glass plates, or similar material which are movable with respect to each other. These walls are separated by an elastic or yieldable peripheral wall such as a gasket of plasticized polyvinyl chloride, vinyl chloride-vinyl acetate copolymer, polyisobutylene, ethylene polysulphide polymer such as "Thiokol," rubber or rubber substitutes, yieldable metal or other convenient material arranged along the circumferential margins of the plates often serving as the end walls, top and bottom of the mold or a portion thereof. The side walls are clamped together by suitable clamps or other means and the mold is filled with the monomeric ester or a syrupy partially polymerized ester. Thereafter, the mold is heated and/or subjected to ultra-violet light until the polymer is polymerized to a solid gel. This gel comprises a mixture of insoluble polymer and unpolymerized monomer and/or partially polymerized monomer containing a soluble polymer of said ester. The monomer and the partially polymerized soluble polymer are soluble in numerous solvents such as acetone, dioxane, benzene, toluene, xylene, etc. On the other hand, the insoluble polymer is not dissolved by such solvents and is not appreciably soluble in any of the usual organic solvents for polymers of unsaturated compounds. Accordingly, it is possible to ascertain the degree of polymerization simply by determining the degree of insolubility of the polymer. This may be done by pulverizing a weighed portion of the gel, extracting it with a solvent for a soluble fusible polymer of the gel such as acetone and determining the percentage of the gel extracted. Generally, the gel contains at least 10 percent of insoluble polymer.

After the gel has been formed it is necessary to continue polymerization until it has acquired sufficient strength to prevent its tearing upon removal from the mold and also to ensure production of a sheet, tube, or other product which is not impaired by handling or by further curing. During such polymerization shrinkage of the polymer occurs and some pressure is applied to the movable walls of the mold to prevent or minimize fracturing. This may be done by applying a light pressure to the smooth surfaced side walls in any convenient manner. The amount of pressure should be at least sufficient to prevent release of the polymer from the glass or metal side walls. Preferably, the pressure should be sufficient to cause the polymer to shrink at least preponderantly or even substantially wholly in a single dimension and to prevent or substantially minimize shrinkage of the gel along the surface of the side walls of the mold. The provision of the elastic or deformable gasket or separator between the side walls permits such walls to follow the shrinkage under the applied pressure and to minimize or prevent such shrinkage along the surface of the side walls and laterally of the applied pressure.

The amount of pressure required to be applied to the walls is dependent upon the strength of the gel and should not in any case be so great as to crush the gel. Preferably, this pressure should be sufficient to cause the percentage decrease in the distance between the mold side walls to which the pressure is applied (as determined when the monomer is placed in the mold and just before the polymer is removed therefrom) should be well in excess of one-third and preferably at least 50 to 75 of the percentage change in the specific volume of the material during this period of polymerization. In other words, the percentage of shrinkage of the polymer as determined by determining the percentage decrease in the distance between the mold walls to which the pressure is applied before polymerization and after polymerization has proceeded until the polymer is to be removed should substantially exceed the percentage shrinkage of the polymer in other directions and should constitute the preponderant shrinkage occurring at least until the pressure on polymer is released and it is removed from the mold. The pressure required for this purpose is, in general, at least 0.25 pound per square inch but in most cases should not exceed 20 pounds per square inch and often under such pressures all or nearly all of the shrinkage occurs in the direction of the applied pressure.

For example, upon polymerization of diethylene glycol bis (allyl carbonate) it is found that the specific volume of the material decreases by about 14 percent during polymerization. In cast polymerization of sheets as herein described using 3 to 4 pounds per square inch pressure upon the side walls, it has been observed that the thickness of the polymer or the distance between such side walls decreases about 12 percent while little or no shrinkage appears to occur laterally. Upon removal of the polymer from the mold, however, the polymer shrinks laterally about 1 to 2 percent of its length and width. In any case, however, it will be apparent that the 12 percent shrinkage in thickness is the preponderant shrinkage, at least before the polymer is removed from the mold. Assuming the lateral shrinkage to be one percent in each direction, the percentage shrinkage due to the pressure is twelve-fourteenths, or about 85 percent.

Various modifications of the process are possible. For example, the polymer may be polymerized to a gel and the peripheral wall mold then removed, whereby the glass or similar plates are separated only by the gel and the pressure is applied directed to the gel. Similarly, the polymer may be polymerized in a mold in which the peripheral walls are non-elastic and after the polymer gelled, the peripheral walls may be removed. Thereafter, pressure may be applied to the side walls and polymerization continued. In any of these processes an essential feature is the application of pressure to the sidewalls of the mold after the gel has been formed to keep such walls in contact with the gel and preferably, to force shrinkage to occur preponderantly in the direction of the applied pressure while the gel is in the mold.

The polymerization is generally conducted by heating the ester in the presence of a polymerization catalyst such as benzoyl peroxide, acetone peroxide, ethyl percarbonate, amyl percarbonate, lauryl peroxide, methyl ethyl ketone peroxide, or other per compound capable of liberating free oxygen. In order to ensure production of hard, tough polymers the cast polymerization must be conducted under conditions such that complete decomposition of the catalyst is avoided while the polymer remains in the mold or at least until polymerization is 90 to 95 percent complete. The degree of completion of polymerization may be ascertained by determination of the percentage insolubility, specific volume, density, or index of refraction and by comparison of the values thus determined with the same properties of the same material when completely polymerized.

The temperature of polymerization to be utilized is dependent to a large degree upon the activity of the monomer and the nature of the catalyst used. Generally speaking, the esters should be polymerized at a temperature at which the per compound slowly decomposes but below that at which the percentage rate of decomposition of the total amount of per compound in the ester exceeds the percentage rate of polymerization of the ester. Thus, when the ester is 70 percent polymerized, it is preferred that it contain at least 30 per cent of the per compound initially added thereto.

The temperature permissible must of course be dependent upon the temperature at which the per compound is active. Thus, when benzoyl peroxide, lauroyl peroxide, or diacetyl peroxide is used as a catalyst, the temperature should not exceed 90° C. during the initial period of polymerization, and in the polymerization of most unsaturated alcohol esters, the temperature preferably should not be less than 60° C. However, after polymerization has proceeded until the polymer has become largely insoluble, for example, 85 percent insoluble, this temperature may be gradually increased up to as high as 125° C. or above in order to secure a substantially completely polymerized product. In treatment of vinyl esters somewhat lower temperatures may be advisable.

When acetone peroxide is utilized, substantially higher temperatures are generally used and in such a case polymerization is generally initiated at 125 to 150° C. Other ketone peroxides generally require similar or slightly higher temperatures.

When percarbonates such as are formed by reaction of a chloroformate such as ethyl chloroformate with sodium peroxide are used, the esters should be polymerized at a temperature of 20 to 50° C., since with higher temperatures these per compounds decompose with excessive rapidity.

The following is a list of suitable per compounds which may be used and a recommended range of temperature for such compounds in the initial stages of polymerization of the unsaturated alcohol polyesters of polyacids:

| | °C. |
|---|---|
| Benzoyl peroxide | 70 to 80 |
| Acetyl peroxide | 70 to 90 |
| Diethyl percarbonate | 45 to 70 |
| Allyl percarbonate | 50 to 80 |
| Acetone peroxide | 125 to 150 |
| Methyl ethyl ketone peroxide | 115 to 140 |
| Methyl n-amyl ketone peroxide | 110 to 135 |
| Methyl isobutyl ketone peroxide | 110 to 135 |
| Methyl n-propyl ketone peroxide | 115 to 140 |
| β-Chlorobenzoyl peroxide | 85 to 95 |
| Methyl isobutyl peroxide | 130 to 150 |
| Dicyclohexyl peroxide | above 150 |
| Ethyl peroxide | 125 to 145 |

Numerous other compounds capable of evolving oxygen upon heating such as alkali metal persulphates, percarbonates, or perborates, hydrogen peroxide, etc., may also be used as catalysts for this purpose. The polymerization of these compounds may be conducted substantially entirely at the temperatures specified above or the temperature of polymerization may be increased to some degree after a gel of substantial insoluble content has been produced.

The progress of polymerization may be determined by periodic analysis of samples or test pieces of the polymer to determine the peroxide content thereof. By this means it is possible to follow closely the rate of decomposition of peroxide and to ascertain the optimum conditions of operation.

The following table indicates the correlation of the rates of polymerization and peroxide decomposition to the rates of increase of acetone insoluble content and hardness which were obtained upon study of the cast polymerization of diethylene glycol bis (allyl carbonate) containing 2 percent benzoyl peroxide was polymerized by heating at 70° C. for 14 hours.

| Hours of polymerization | Per cent of polymer insoluble in acetone | Percent of peroxide in polymer | Knoop hardness |
|---|---|---|---|
| 7.5 | 50 | 1.25 | Too soft for determination. |
| 24 | 80 | 0.9 | Do. |
| 36 | 89 | 0.6 | 14. |
| 48 | 94 | 0.5 | 16. |
| 64 | 95 | 0.4 | 17. |

The initial amount of per compound added to the ester is of considerable importance in the preparation of a hard tough polymer since, otherwise, the peroxide will decompose before polymerization is complete. Moreover, the concentration of peroxide has a bearing upon the permissible temperature of polymerization, increased concentrations thereof generally permitting an increase in the polymerization temperature. In most cases at least one percent and preferably two or more percent of peroxide based upon the weight of ester is desirable. In cast polymerization processes, the entire quantity of per compound must be added before the polymer sets to a gel and in order to ensure production of a hard, strong polymer, generally at least 30 percent of the initial peroxide should be present when the polymer has become 70 percent acetone insoluble. Usually it is found essential to utilize sufficient peroxide to ensure the presence of at least 0.5 percent peroxide based upon the weight of the polymer when the polymer is 85 percent insoluble in order to ensure the production of a hard product.

The invention may be applied to polymerization of various esters of unsaturated alcohols and is particularly directed to esters of alcohols containing 2 to 5 carbon atoms and polyacids or polybasic acids. Thus, the invention is applicable to esters of vinyl, allyl, methallyl, isopropenyl, alpha or beta ethyl allyl, dimethyl allyl, crotyl, propargyl, butadienyl, or methyl propargyl alcohols, ethylvinyl carbinol, or methylvinyl carbinol. It may also be applied to esters of alcohols containing up to 10 carbons such as cinnamyl, phenyl propargyl, or linallyl alcohols.

The term "polyacid" as used herein is intended to include any compound containing two esterifiable acid groups. Thus, the term includes the simple polycarboxylic acids such as oxalic, phthalic, succinic, maleic, fumaric, itaconic, adipic, citric, tartaric, tricarballylic, diglycollic, or dilactic acids or the simple inorganic acids, boric, silicic, titanic, phosphoric, stannic, or sulphuric acids. In addition, the term also includes the more complex acids (which may be designated as "polyacidic esters") wherein at least one and preferably not more than six ester linkages are present between a pair of acid groups. Many of these acids do not exist in the free state but esters thereof do exist. Thus, the term includes the compounds

HOOC—CH₂—O—CH₂—CH₂COOH ethylene bis (acid phthalate)

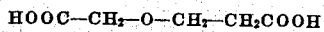
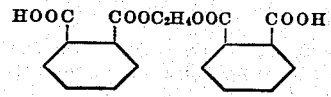

ethylene bis (acid carbonate)

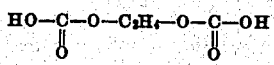

or the compound

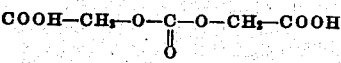

etc.

Thus, strong clear products may be secured by polymerizing unsaturated alcohol esters of simple polybasic acids such as diallyl phthalate, diallyl maleate, allyl ethyl maleate, allyl oleyl maleate, allyl stearyl maleate, allyl lauryl fumarate, diallyl fumarate, allyl ethyl fumarate, vinyl allyl succinate, diallyl succinate, diallyl adipate, tetrallyl silicate, tetrallyl titanate, tetrallyl stannate, or the corresponding esters of other unsaturated alcohols.

Moreover, the compounds ethylene glycol bis (allyl carbonate), triethylene glycol bis (allyl carbonate), tetraethylene glycol bis (allyl carbonate), propylene glycol bis (allyl carbonate), ethylene glycol bis (allyl phthalate), diethylene glycol bis (allyl phthalate), or other polyester of (a) a polyhydric compound and (b) an acid ester of a simple polybasic acid and an unsaturated alcohol such as described in an application for Letters Patent of Irving E. Muskat and Franklin Strain, Serial No. 361,280, filed October 15, 1940, may be polymerized by the method herein described. Many of these compounds may be regarded as esters of the theoretical acid

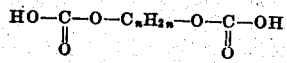

In addition, esters prepared by reaction of unsaturated lactates such as allyl lactate with phosgene, sulphuryl chloride, phosphoryl chloride, or allyl chloroformate, in the presence of an alkali as described in the above-mentioned application for Letters Patent may be used for this purpose. Thus, allyl lactate may be reacted with phosgene in the presence of an alkaline agent to form the compound

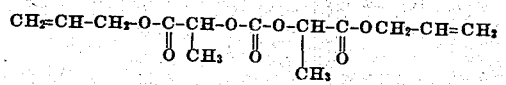

which may be regarded as an ester of the polyacid

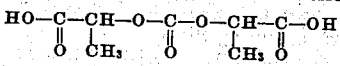

In addition, allyl chloroformate may be reacted with vinyl or allkyl lactate to form the vinyl allyl or diallyl ester of the theoretical polyacid

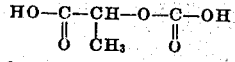

or allyl chloroformate may be reacted with glycol dilactate to form the diallyl ester of the theoretical polyacid

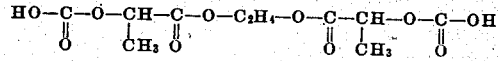

Esters of other unsaturated alcohols may be made in a similar manner. Moreover, desirable products may be secured by use of the materials obtained by treatment of unsaturated carbamates, phthalamates, oxamates, etc., with an aldehyde such as formaldehyde in the presence of an acid or alkaline catalyst such as described by Albert G. Chenicek, Serial No. 398,241, filed June 16, 1941. Monoesters of the above polyacids such as vinyl allyl maleate, allyl methyl maleate, vinyl ethyl phthalate, vinyl ethyl adipate, or mixed esters such as are formed by reaction of unsaturated chloroformates with partial esters of unsaturated acids and polyhydric alcohols such as glycol monoacrylate, glycol monomethacrylate, etc., may be used.

Copolymers of the above compounds with other compounds such as styrene, vinyl acetate, methyl methacrylate, methyl acrylate, butadiene, alpha or beta chlorobutadiene, methyl acrylate, ethyl acrylate, methyl methacrylate, allyl methacrylate, glycol dimethacrylate, methallyl acrylate, etc. While the proportions of such compounds may be varied, it is generally preferred to polymerize mixtures which contain at least 40 percent by weight of the unsaturated alcohol polyester of the polybasic acid or polyacid.

Example I

A mold was prepared by clamping a pair of tempered glass sheets 18 inches square together face-to-face by means of C clamps located along the edges of the mold, using a flexible gasket of "Koroseal," a plasticized polyvinyl chloride, approximately one-eighth inch in thickness and one-fourth inch in width as a separator located between the sheets and adjacent the edges thereof. The mold thus formed is mounted vertically upon one corner thereof.

A quantity of partially polymerized ethylene glycol bis (allyl carbonate) was prepared by heating a composition containing the monomeric ester and 3 percent benzoyl peroxide until the viscosity increased 500 percent. This thickened monomer was poured into the mold and the mold allowed to stand until air bubbles had risen to the upper corner of the mold and escaped. Thereafter, the mold was heated at 70° C. while maintaining the polymer under moderate pressure by periodically tightening the clamps moderately in order to substantially prevent lateral or longitudinal shrinkage during the polymerization. The pressure thus maintained on the gel by the plates was approximately 3 to 4 pounds per square inch. After 72 hours of heating the polymer was removed and a strong, unfractured, transparent polymer one-eighth inch in thickness was obtained.

Example II

A mold described in Example I was filled with diethylene glycol bis (allyl carbonate) containing 3 percent benzoyl peroxide and the assembly was heated at 70° C. for 2 hours. Thereafter, the clamps were tightened sufficiently to prevent leakage of the liquid resin and to establish a pressure of 2.57 pounds per square inch upon the gasket. The assembly was then heated according to the following schedule:

| | Hours |
|---|---|
| 74° C. | 1.00 |
| 78° C. | 2.00 |
| 82° C. | 1.75 |
| 86° C. | 1.25 |
| 90° C. | 0.5 |
| 95° C. | 0.25 |
| 97° C. | 0.25 |
| 100° C. | 0.25 |
| 104° C. | 0.12 |
| 107° C. | 0.12 |
| 111° C. | 0.12 |
| 115° C. | 2.00 |

After completion of the first two hours of the above schedule the pressure upon the glass plates was increased to 3.7 pounds per square inch and after completion of the first four hours of the above cycle, the pressure was increased to six pounds per square inch. Thereafter, the pressure was maintained until the schedule was completed. The above pressures were sufficient to substantially minimize lateral and longitudinal shrinkage during polymerization in the mold. A hard, fracture-free sheet was thereby secured. The percentage decrease in thickness of the polymer between the time of gelation and that at which polymerization was discontinued equalled 85 percent of the percentage decrease of the specific volume thereof.

Example III

A quantity of diallyl phthalate containing 5 percent of benzoyl peroxide was heated in an atmosphere of carbon dioxide at 70° C. until the viscosity doubled. Thereafter, the product was poured into a mold constructed as described in Example I and having internal dimensions of 6 inches by 6 inches by one-fourth inch. The ester was heated at 70° C. for 48 hours. During this period a pressure of approximately 4 pounds per square inch was maintained upon the glass plates of the mold. Thereafter, the mold was cooled and the polymer removed, a fracture-free sheet being secured.

Example IV

A mold was prepared as in Example I, using a flexible gasket of about one inch in thickness. This mold was filled with diethylene glycol bis (allyl carbonate) containing 3 percent by weight of benzoyl peroxide and was heated according to the following schedule:

| Time | Temperature |
|---|---|
| | ° C. |
| 3.0 hours | 56 |
| 7.5 hours | 57 |
| 4.9 hours | 58 |
| 6.0 hours | 59 |
| 5.7 hours | 60 |
| 4.9 hours | 61 |
| 4.2 hours | 62 |
| 3.0 hours | 63 |
| 3.3 hours | 64 |
| 3.6 hours | 65 |
| 3.0 hours | 66 |
| 2.4 hours | 67 |
| 2.0 hours | 68 |
| 2.0 hours | 69 |
| 2.0 hours | 70 |
| 1.25 hours | 71 |
| 1.7 hours | 72 |
| 1.25 hours | 73 |
| 1.1 hours | 75 |

A pressure of 3 pounds per square inch was applied to the plates initially. After polymerization has proceeded for 10.5 hours the pressure was increased to about 5 pounds per square inch. After 21 hours the pressure was increased to 6 pounds per square inch and after 27 hours this pressure was increased to 9 pounds per square inch. By this means the shrinkage recurred substantially wholly in the direction of the applied pressure. Upon removal, however, substantial lateral shrinkage occurred and an unfractured, clear polymer about 0.9 inch in thickness was obtained.

Example V

The process of Example III was repeated using diallyl succinate containing 5 percent benzoyl peroxide in lieu of diallyl phthalate.

Example VI

The process of Example I was repeated using diallyl carbonate containing 3 percent benzoyl peroxide.

We claim:

1. A method of preparing a sheet of a clear resinous polymer of an ester having two terminal alkenyl radicals each containing at least three carbon atoms in a straight chain and having the olefinic bond between the second and third carbon atoms from the valence bond, which method comprises placing a liquid mixture of said ester and a polymerization catalyst in a mold consisting of two glass plates maintained in spaced parallel relation by an elastic edge spacer, heating the mold until the ester is polymerized to a soft brittle gel, thereafter applying an initial pressure to the mold walls in a direction vertical to the plane of the glass plates, said pressure being insufficient to crush the gel within the mold, continuing the heating of the mold further to polymerize the ester and to convert it into a hard solid resin, periodically increasing the pressure upon the mold walls as the polymerization proceeds to prevent contraction of the polymer in the plane of the resin sheet, and removing the polymerized ester from the mold whereby contraction occurs in the plane of the resin sheet.

2. A method of preparing a sheet of a clear resinous polymer of an ester of a polybasic acid and an unsaturated alcohol which contains two terminal alkenyl radicals each having at least three carbon atoms in a straight chain and having the olefinic bond between the second and third carbon atoms from the valence bond, which method comprises placing a liquid mixture of said ester and a polymerization catalyst in a mold consisting of two glass plates maintained in spaced parallel relation by an elastic edge spacer, heating the mold until the ester is polymerized to a soft brittle gel, thereafter applying an initial pressure to the mold walls in a direction vertical to the plane of the glass plates, said pressure being insufficient to crush the gel within the mold, continuing the heating of the mold further to polymerize the ester and to convert it into a hard solid resin, periodically increasing the pressure upon the mold walls as the polymerization proceeds to prevent contraction of the polymer in the plane of the resin sheet, and removing the polymerized ester from the mold whereby contraction occurs in the plane of the resin sheet.

3. A method of preparing a sheet of a clear resinous polymer of a diallyl ester of a dicarboxylic acid, which method comprises placing a liquid mixture of said ester and a polymerization catalyst in a mold consisting of two glass plates maintained in spaced parallel relation by an elastic edge spacer, heating the mold until the ester is polymerized to a soft brittle gel, thereafter applying an initial pressure to the mold walls in a direction vertical to the plane of the glass plates, said pressure being insufficient to crush the gel within the mold, continuing the heating of the mold further to polymerize the ester and to convert it into a hard solid resin, periodically increasing the pressure upon the mold walls as the polymerization proceeds to prevent contraction of the polymer in the plane of the resin sheet, and removing the polymerized ester from the mold whereby contraction occurs in the plane of the resin sheet.

4. A method of preparing a sheet of a clear resinous polymer of diallyl phthalate, which comprises placing a liquid mixture of diallyl phthalate and a polymerization catalyst in a mold consisting of two glass plates maintained in spaced parallel relation by an elastic edge spacer, heating the mold until the diallyl phthalate is polymerized to a soft brittle gel, thereafter applying an initial pressure to the mold walls in a direction vertical to the plane of the glass plates, said pressure being insufficient to crush the gel within the mold, continuing the heating of the mold further to polymerize the diallyl phthalate and to convert it into a hard solid resin, periodically increasing the pressure upon the mold walls as the polymerization proceeds to prevent contraction of the polymer in the plane of the resin sheet, and releasing the polymerized diallyl phthalate from the mold whereby contraction occurs in the plane of the resin sheet.

5. A method of preparing a sheet of a clear resinous polymer of diallyl succinate, which comprises placing a liquid mixture of diallyl succinate and a polymerization catalyst in a mold consisting of two glass plates maintained in spaced parallel relation by an elastic edge spacer, heating the mold until the diallyl succinate is polymerized to a soft brittle gel, thereafter applying an initial pressure to the mold walls in a direction vertical to the plane of the glass plates, said pressure being insufficient to crush the gel within the mold, continuing the heating of the mold further to polymerize the diallyl succinate and to convert it into a hard solid resin, periodically increasing the pressure upon the mold walls as the polymerization proceeds to prevent contraction of the polymer in the plane of the resin sheet, and removing the polymerized diallyl succinate from the mold whereby contraction occurs in the plane of the resin sheet.

6. A method of preparing a sheet of a clear resinous polymer of diethylene glycol bis (allyl carbonate), which comprises placing a liquid mixture of diethylene glycol bis (allyl carbonate) and a polymerization catalyst in a mold consisting of two glass plates maintained in spaced parallel relation by an elastic edge spacer, heating the mold until the diethylene glycol bis (allyl carbonate) is polymerized to a soft brittle gel, thereafter applying an initial pressure to the mold walls in a direction vertical to the plane of the glass plates, said pressure being insufficient to crush the gel within the mold, continuing the heating of the mold further to polymerize the diethylene glycol bis (allyl carbonate) and to convert it into a hard solid resin, periodically increasing the pressure upon the mold walls as the polymerization proceeds to prevent contraction of the polymer in the plane of the resin sheet, and removing the polymerized diethylene glycol bis (allyl carbonate) from the mold whereby contraction occurs in the plane of the resin sheet.

WILLIAM R. DIAL.
CHARLES GOULD.